United States Patent
Emadi et al.

(10) Patent No.: US 12,313,725 B2
(45) Date of Patent: May 27, 2025

(54) SYSTEM AND METHOD FOR RADAR STATIC-DYNAMIC SEGMENTATION

(71) Applicant: Zadar Labs, Inc., Santa Clara, CA (US)

(72) Inventors: Mohammad Emadi, Santa Clara, CA (US); Vitalii Topolnytskyi, Santa Clara, CA (US); Ali Mostajeran, Santa Clara, CA (US); Joshua Skow, Santa Clara, CA (US); Navid Fattahi, Santa Clara, CA (US)

(73) Assignee: Zadar Labs, Inc., Santa Clara, CA (US)

( * ) Notice: Subject to any disclaimer, the term of this patent is extended or adjusted under 35 U.S.C. 154(b) by 377 days.

(21) Appl. No.: 17/957,426

(22) Filed: Sep. 30, 2022

(65) Prior Publication Data
US 2024/0111043 A1 Apr. 4, 2024

(51) Int. Cl.
*G01S 13/52* (2006.01)
*G01S 7/41* (2006.01)

(52) U.S. Cl.
CPC .............. *G01S 13/52* (2013.01); *G01S 7/415* (2013.01)

(58) Field of Classification Search
CPC ........ G01S 13/931; G01S 13/52–13/56; G01S 7/40; G01S 7/4026; G01S 7/403; G01S 7/4034; G01S 7/4052; G01S 7/415
See application file for complete search history.

(56) References Cited

U.S. PATENT DOCUMENTS

| | | | |
|---|---|---|---|
| 10,796,453 B1* | 10/2020 | Yan | B60R 11/04 |
| 2015/0369912 A1* | 12/2015 | Kishigami | G01S 13/34 |
| | | | 342/104 |
| 2017/0299711 A1* | 10/2017 | Kishigami | G01S 13/5242 |
| 2018/0180731 A1* | 6/2018 | Inoue | G01S 15/931 |
| 2018/0364330 A1* | 12/2018 | Klotzbuecher | G01S 13/42 |
| 2020/0386883 A1* | 12/2020 | Hofmann | G01S 13/584 |
| 2022/0137227 A1* | 5/2022 | Armstrong-Crews | |
| | | | B60W 30/0956 |
| | | | 701/26 |
| 2022/0179060 A1* | 6/2022 | Hakobyan | G01S 13/72 |
| 2023/0003871 A1* | 1/2023 | Qian | G06N 20/00 |
| 2023/0161026 A1* | 5/2023 | Grebner | G01S 7/354 |
| | | | 342/113 |
| 2023/0280446 A1* | 9/2023 | Ren | G01S 13/4454 |
| | | | 342/202 |

(Continued)

*Primary Examiner* — Peter M Bythrow
(74) *Attorney, Agent, or Firm* — NovoTechIP International PLLC (57) ABSTRACT

A system and method to receive radar returns from objects in response to radar scans from a moving radar system, wherein the radar returns include Doppler shift, to adjust velocity indicated in each of the radar returns based on an azimuth of each radar return to generate a set of adjusted radar returns, to group the adjusted radar returns into groups based on the velocity indicated in each of the adjusted radar returns, each group having a predetermined minimum velocity value Vmin, a predetermined maximum velocity value Vmax, and a predetermined threshold velocity difference value between Vmin and Vmax, and to determine which of the objects are static objects based on determining which group has the highest number of adjusted radar returns. Vehicle speed and speed of other moving objects can be determined based on determining which objects are static.

21 Claims, 8 Drawing Sheets

(56) References Cited

U.S. PATENT DOCUMENTS

| | | | |
|---|---|---|---|
| 2024/0255612 A1* | 8/2024 | Akamine | G01S 7/415 |
| 2024/0264294 A1* | 8/2024 | Kreidler | B60W 40/02 |
| 2024/0329237 A1* | 10/2024 | Hayashi | G01S 13/86 |

* cited by examiner

SYSTEM AND METHOD FOR RADAR STATIC-DYNAMIC SEGMENTATION

BACKGROUND

As is well known, radar is capable of detecting the speed of objects by measuring Doppler velocity of the objects. Doppler velocity is radial velocity of an object, or in simple terms, an object's speed toward or away from the radar system that transmitted a radar signal toward the object. When both a radar system and an object are static (i.e., not moving) then measured Doppler velocity for the object will be equal to 0 (zero). For moving objects, on the other hand, a static radar system will measure positive or negative Doppler which is equal to the radial velocity of those objects relative to the static radar system. Separating objects as being static (not moving) and dynamic (moving) is called static-dynamic segmentation. Such separation is very useful and crucial for multiple radar applications, for example, for autonomous vehicles, surveillance, and traffic monitoring, to name just a few.

For example, some benefits of segmenting between static objects and dynamic moving objects include separating real threats (e.g., moving objects) from benign threats (e.g., non-moving objects), use in camera systems, and situations where it is necessary to have several frames to start tracking and predicting the next movements of an object. In short, being able to quickly determine velocity of moving targets is extremely useful for achieving faster and more accurate tracking. This can result in better planning (i.e., decision making), and can reduce the computational burden of any AI/ML algorithms, for example, for camera systems, by only focusing on dynamic objects.

Although determining object movement, and segmenting static objects from dynamic objects, works well when the radar system itself is static, this is not the case when the radar system is moving. The situation of a moving radar system frequently occurs, for example, with radar systems mounted on moving vehicles, such a self-driving cars, or on robots. In particular, when the radar system itself is moving, even static objects will have non-zero doppler and will appear to be moving. Therefore, it is impossible to separate static and dynamic objects by just checking if doppler velocity is 0. This is becoming an increasingly large problem for autonomous systems because knowing if an object is moving or not is one of main characteristics of any detected surrounding entities, such as another car or a pedestrian. Accordingly, it is an object of the present disclosure to provide improved static-dynamic segmentation in situations where a radar system is moving relative to surrounding static objects.

SUMMARY

In an implementation, a system is provided including one or more processors and one or more machine-readable media storing instructions which, when executed by the one or more processors, cause the one or more processors to receive radar returns from objects in response to radar scans of transmitted radar signals from the radar system, wherein the radar returns include Doppler shift, adjust a velocity indicated in each of the radar returns based on an azimuth of each of the received radar returns to generate a set of adjusted radar returns, group the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, and determine which of the objects are static objects based on determining which group of the plurality of groups has highest number of adjusted radar returns.

In another implementation, a method is provided including receiving radar returns from objects in response to radar scans of transmitted radar signals from a radar system, wherein the radar returns include Doppler shift, adjusting a velocity indicated in each of the radar returns based on an azimuth of each of the received radar returns to generate a set of adjusted radar returns, grouping the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, and determining which of the objects are static objects based on determining which group of the plurality of groups has highest number of adjusted radar returns.

In another implementation, a system to segment static objects from dynamic moving objects using a radar system including a transmitter and a receiver mounted on a moving platform, the system including one or more processors coupled to receive signals from the radar system, and one or more machine-readable media storing instructions which, when executed by the one or more processors, cause the one or more processors to: receive radar returns from objects in response to radar scans of transmitted radar signals from the radar system, wherein the radar returns include Doppler shift, adjust a velocity indicated in each of the radar returns based on an azimuth of each of the received radar returns to generate a set of adjusted radar returns, group the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, determine which of the objects are static objects based on determining which group of the plurality of groups has highest number of adjusted radar returns, determine platform velocity of the moving platform from the determination of which objects are static objects by setting velocity for the group of static objects to be zero velocity and determining the platform velocity relative to the zero velocity of the static objects, and determine velocity of the dynamic moving objects identified by the received radar returns, relative to the zero velocity of the group of static object returns.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to segmenting static objects and dynamic objects using a moving radar system based on knowing that the number of static points in the environment is higher than the number of dynamic points, and using that information to separate static and dynamic points.

Figure 1:
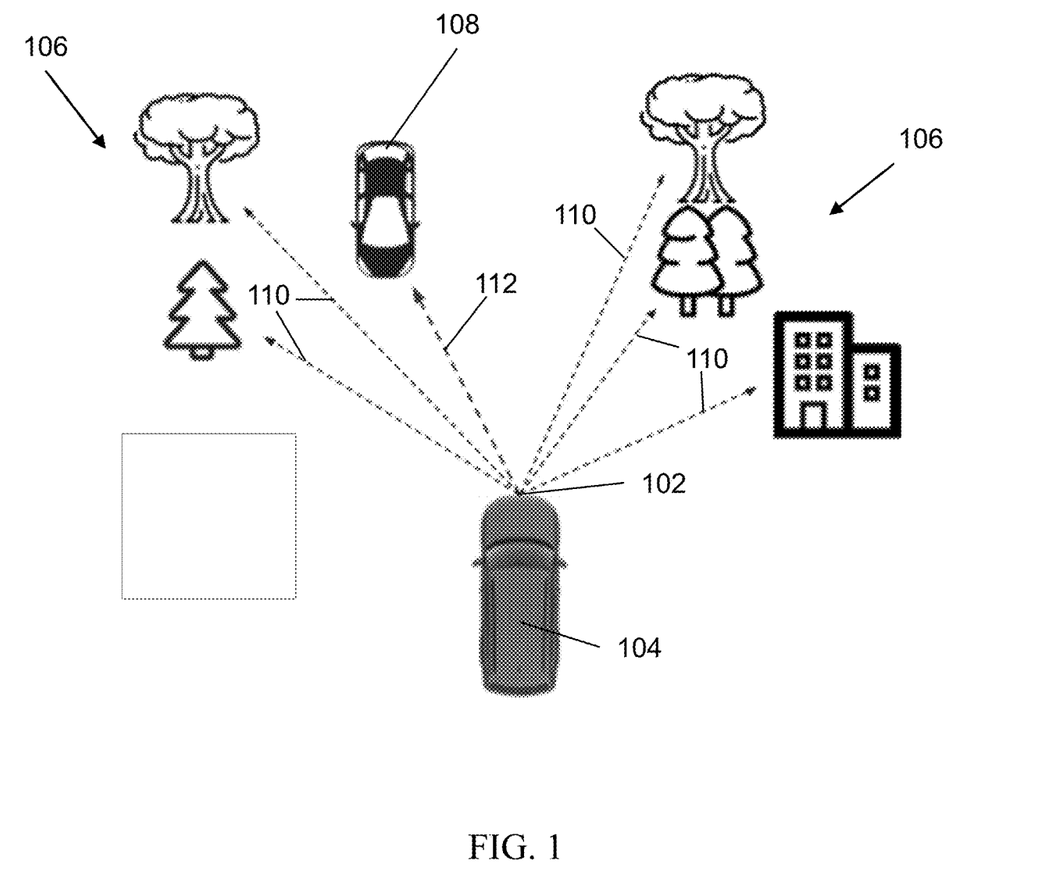
FIG. 1 illustrates an example of an environment in which the system and method of the present disclosure can be utilized.

Referring to FIG. 1, an example is shown of an environment in which the system and method of the present disclosure can be utilized. As shown in FIG. 1, a radar system 102 is mounted on a moving platform 104, such as a moving vehicle, which is in motion relative to a plurality of surrounding static objects 106 and other moving objects 108. The radar system 102 includes a transmitter (not shown) which transmits a plurality of radar signals, including signals 110, which reflect off the surrounding static objects 106, and signals 112, which reflect off other moving objects 108. The radar system 102 also includes a receiver (not shown) to receive the reflected radar returns from the signals 110 and 112 and an on-board computer (not shown) for carrying out the signal processing of the radar returns in the manner discussed below with regard to FIGS. 3-5. Regarding this, the transmitted radar signals 110 and 112 are identical in the outbound direction but will be different in the return direction since the radar returns for the signals 110 will be reflected from static objects, whereas the radar signals 112 will be reflected from moving objects.

Figure 2:
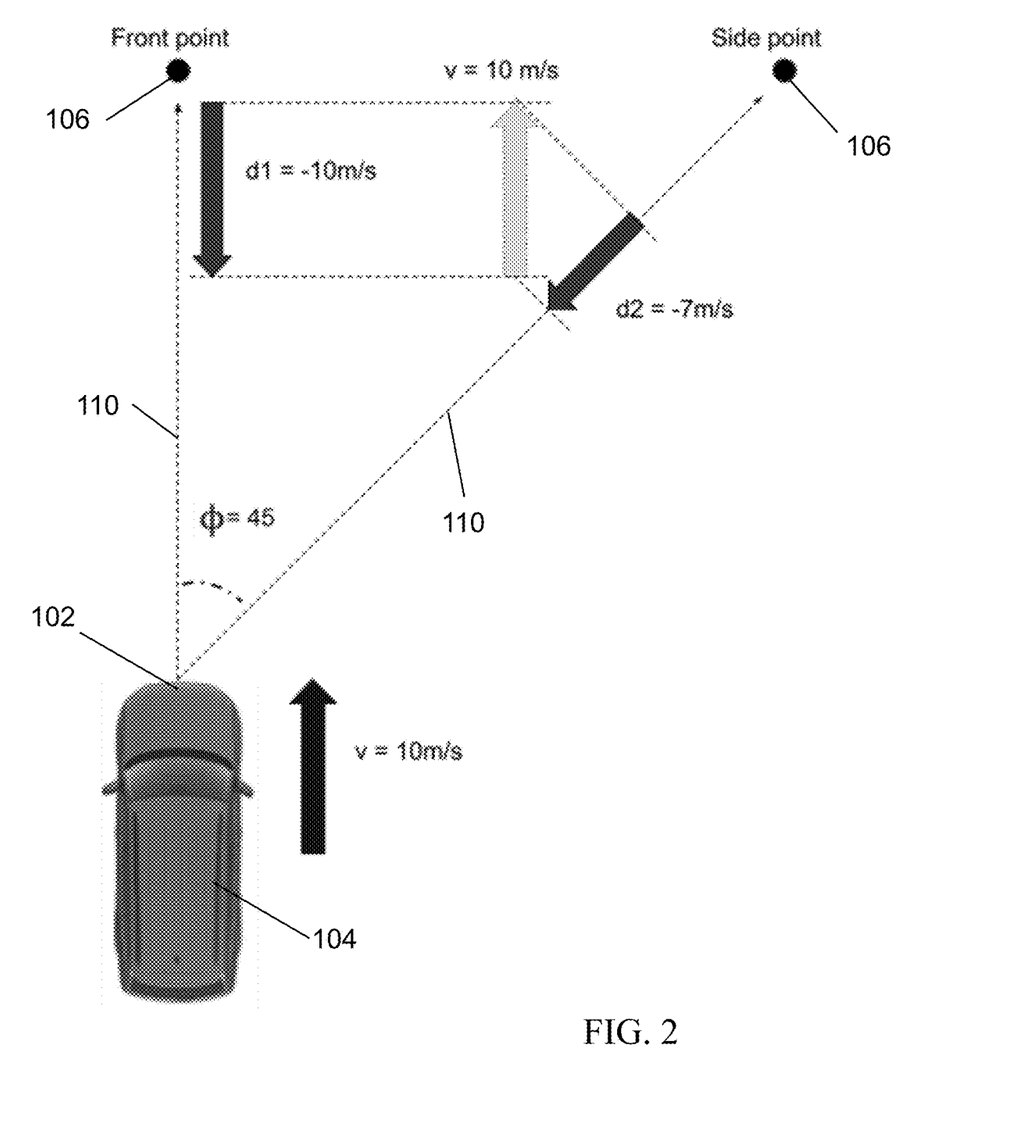
FIG. 2 shows differences in radar returns of static objects at a radar system mounted on a moving platform based on an azimuth of the static objects relative to the moving radar system.

FIG. 2 shows differences in radar returns of static objects at a radar system 102 mounted on a moving platform 104 (e.g., a vehicle in this specific example) based on an azimuth of the static objects relative to the moving radar system, wherein the radar returns include Doppler shift. The issue is that if the moving platform 104 moves with v=10 m/s velocity and the radar system 102 mounted thereon is facing front, a static object 106 directly in front of the moving radar system 102 will have a Doppler velocity d1=−10 m/s but returns from another static object 106 that lays on the side with $\phi=45$ degree azimuth relative to the moving radar system 102 will have a Doppler velocity of d2=−7 m/s. Both points are static objects 106, but as can be seen, they have different Doppler velocity values because of the differences in the angles of the static objects 106 relative to the moving radar system 102.

More specifically, still referring to FIG. 2, the Doppler velocity values for these two illustrated static points have different values because radial velocity is calculated as: Radial Velocity=Car Speed×cos($\phi$), where $\phi$ is azimuth angle for the point. Next, car speed (e.g., the speed of the moving platform 104, which, from this point on will be assumed to be a car, although it is to be understood that this is solely for purposes of example, and any other moving platform could be used) can be calculated as: Car Speed=Radial Velocity cos($\phi$). It is common to represent approaching points with negative Doppler. Given that, and replacing radial velocity with Doppler velocity, one can determine a final equation that is true for each and every static point when car is moving as: Adjusted Car Speed=−Doppler÷cos($\phi$).

It is noted that although the example in FIG. 2 only shows static objects 106 located at different locations, the same principle of the radar returns having different velocity values dependent upon their azimuth angle relative to the moving radar system applies to moving objects 108 shown in FIG. 1 as well. In other words, a moving object 108 directly in front of the moving radar system 102 (e.g., at a front point as shown in FIG. 2) will have a different Doppler velocity in the radar return than a moving object 108 having the same actual velocity but at a side point as shown in FIG. 2.

Figure 3:
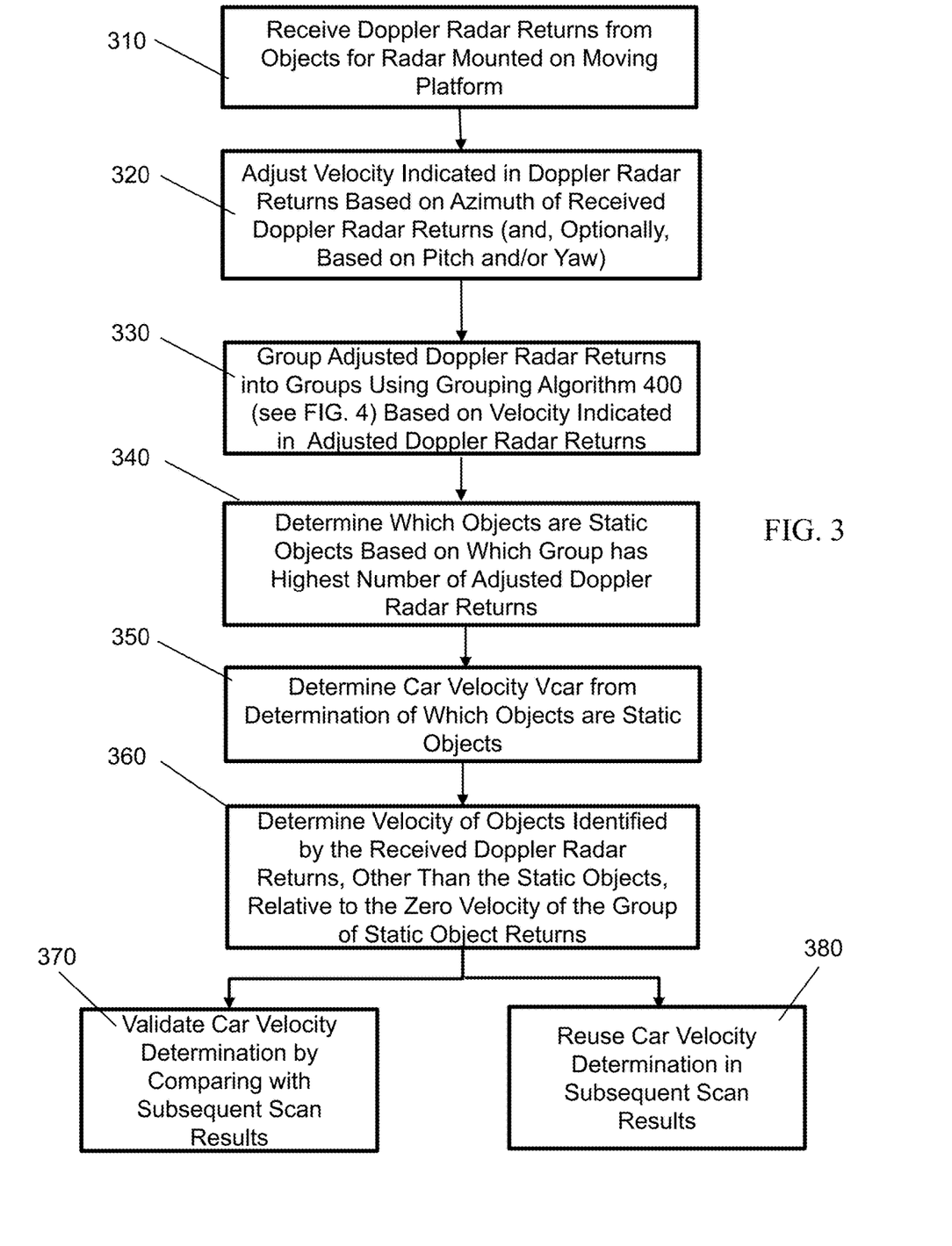
FIG. 3 show a flow diagram of operations of a system for segmentation of static and dynamic objects for a moving radar system, in accordance with aspects of the present disclosure.

FIG. 3 shows a flow diagram of operations of a system for segmentation of static and dynamic objects based on radar returns received from the static objects 106 and the moving objects 108 in response to the radar signals 110 and 112, respectively, from the moving radar system 102 shown in FIGS. 1 and 2. Specifically, in step 310, radar returns from both static objects 106 and moving objects 108 are received in response to radar scans of transmitted radar signals 110 and 112 from the radar system 102. In step 320, a velocity indicated in each of the radar returns is adjusted based on an azimuth of each of the received radar returns to generate a set of adjusted radar returns. For example, the Doppler velocity of d2=−7 m/s shown in FIG. 2 will be adjusted using the formula Adjusted Car Speed (Vcar)=−Doppler÷cos($\phi$) to adjust the Doppler velocity for the static object 106 at the side point shown in FIG. 2 to be −10 m/s (corresponding to the negative equivalent of the actual positive moving speed of the radar system 102 on the moving platform 104).

In addition to making adjustments based on the azimuth of each return, in another alternative implementation of the present disclosure, adjustments of the radar returns from each object can also be made based on yaw and/or pitch of the radar system 102 on the moving platform 104. More specifically, the equations discussed above for making adjustments based on the azimuth of the radar returns are deduced for the case when the radar system 102 is facing forward. If the radar system 102 is placed on a moving platform 104, for example a car or a robot, with some yaw and/or pitch angle, then these angles can be added to the above equation for car speed. Specifically, assuming, for purposes of example, that the moving platform 104 is a car, the adjusted car speed can be calculated using the equation:

$$\text{Adjusted Car Speed } (Vcar) = -\text{Doppler} \div \cos(\phi + \phi r) \pm \cos(\theta + \theta r)$$

where $\phi r$—radar yaw angle
$\theta r$—radar pitch angle

In accordance with another alternative implementation of the present disclosure, for radar systems 102 with high resolution in elevation the car speed formula can be extended with $\theta$ angle (pitch) additionally to $\phi$ angle (azimuth or yaw) using the adjustment equation:

$$\text{Adjusted Car Speed } (Vcar) = -\text{Doppler} \div \cos(\phi) \div \cos(\theta)$$

It is also important to handle edge cases when the result of either of the above cosine functions in the equations for adjusting car speed based on a combination of azimuth of the radar returns, yaw and/or pitch becomes 0. That would produce division by zero. While front facing radar with less than 180 degrees view angle will never create such a situation, side radars can have this issue. That can happen, for example, for points that have an angle sum equal to 90 degrees. These points lay on a line that is perpendicular to the car side and draw from the radar center, and, therefore, can be safely excluded from the calculation of adjusted car speed using the above formulas based on yaw and/or pitch of the car. For the three dimensional (3D) case this line becomes a plane.

Still referring to FIG. 3, in step 330 the adjusted radar returns from step 320 are grouped into a plurality of groups using a grouping algorithm 400 (that will be discussed below with reference to FIG. 4) based on the velocity indicated in each of the adjusted radar returns. Each of the groups has a predetermined minimum velocity value Vmin, a predetermined maximum velocity value Vmax, and a predetermined threshold velocity difference value between Vmin and Vmax. In step 340, it is determined which of the objects are static objects based on determining which group of the plurality of groups has the highest number of adjusted radar returns. This will be discussed in further detail below with reference to FIGS. 4 and 5.

Next, in step 350, once the determination has been made as to which objects are static objects, platform velocity of the moving platform 104 (and, of course, the radar system 102 mounted thereon) is determined from the determination of which objects are static objects. This determination of platform velocity is based on setting velocity for the group of static objects 106 determined in step 340 to be zero velocity and determining the platform velocity relative to the zero velocity of the static objects 106. In step 360 velocity of the moving objects 108 identified by the received (and adjusted) radar returns, other than the returns from the static objects 108, is determined relative to the zero velocity that has been set for the group of static object returns identified in step 340.

Still referring to FIG. 3, in step 370, once the platform velocity has been determined in step 350, verification of this determination can be performed by comparing the determination with the determination of platform velocity in a subsequent radar scan (e.g., a subsequent transmission of the radar signals 110 and 112, and reception of radar returns from these subsequent transmissions). Further, in step 380, the determined platform velocity can be reused, if desired, in calculations from subsequent radar scans.

Figure 4:
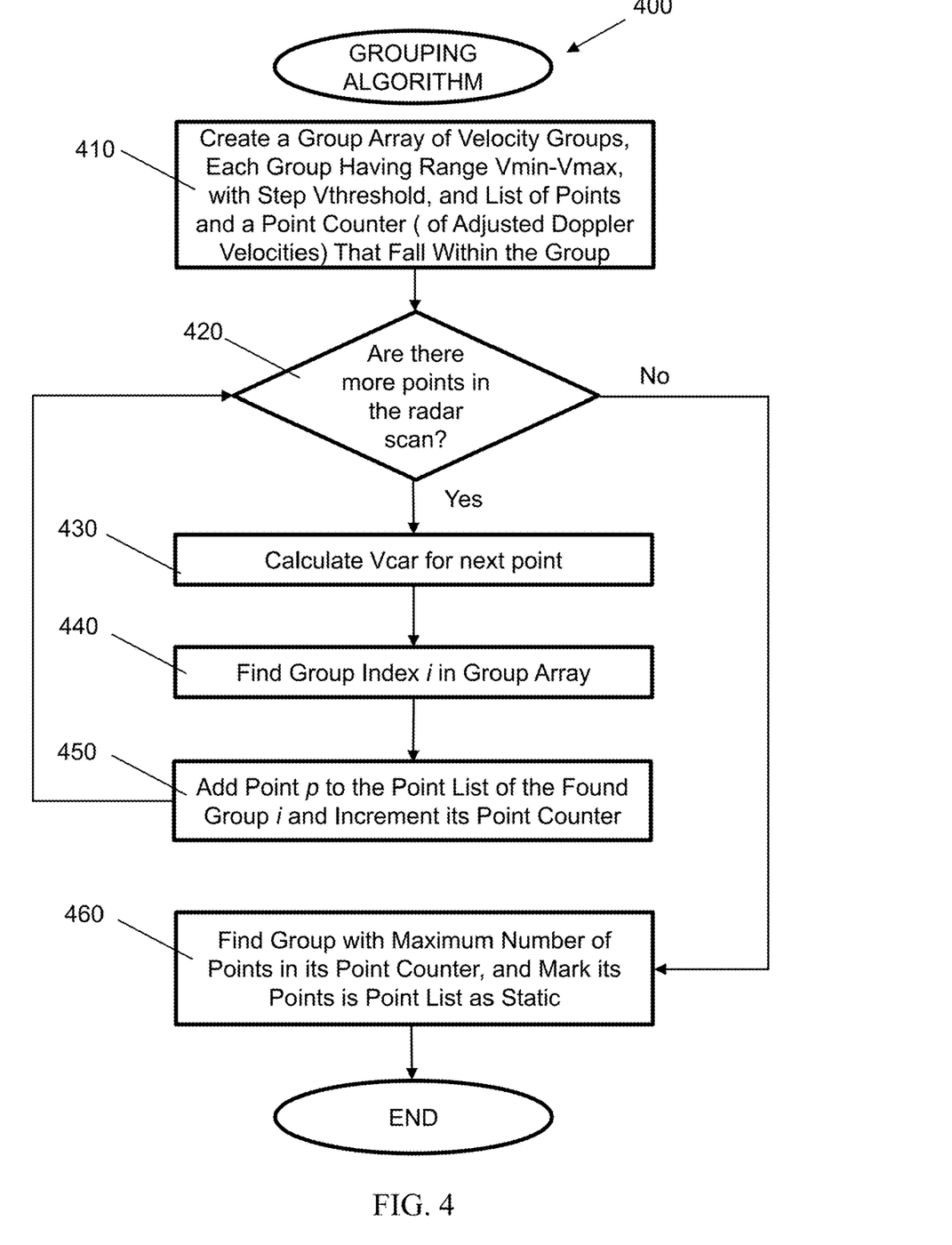
FIG. 4 is a flow diagram showing operations for a grouping algorithm, in accordance with the aspects of the present disclosure.

FIG. 4 is a flow diagram showing operations for a grouping algorithm 400, in accordance with the aspects of the present disclosure. In step 410 a group array of speed groups (which can be continuous adjoining speed groups, if desired) is created, with each speed group having a minimum adjusted Doppler velocity Vmin, a maximum adjusted Doppler velocity Vmax, and a step threshold Vthreshold between Vmin and Vmax. A point counter is provided for each of the speed groups which counts a list of points that are assigned to each speed group based on the adjusted Doppler velocities for each of the detected objects in a radar scan (comprised of all of the returns received from objects for transmission of a plurality of radar signals 110 and 112 in one radar scan). If the speed groups are continuous, the Vmax for one group will be the Vmin for the adjacent higher speed group. Decision step 420 is conducted for each point of a given radar scan (e.g., each "point" being an analysis of each of the adjusted radar returns for a given radar scan, which normally will include a large number of radar returns, each return corresponding to a reflection of the transmitted radar signals of the radar scan from a given static or moving object). This decision step 420 will determine whether all of the points in a given radar scan have already been analyzed and placed into the appropriate speed group, or whether there are still more points in the radar scan to analyze. If the result of the decision step 420 is that more points from the radar scan need to be analyzed, then the analysis proceeds to determine which of the speed groups the next point (e.g., the adjusted Doppler velocity from a given object) should be placed into. This determination of which speed group to place the point into is performed with steps 430, 440 and 450 shown in FIG. 4.

Still referring to FIG. 4, in step 430 the adjusted car speed Vcar is calculated for the next point p in the returns from the radar scan using the formula noted above of Adjusted Car Speed (Vcar)=−Doppler÷cos($\phi$). In step 440, a group index i is determined for one of the speed groups as i=(Vcar−Vmin)/Vthreshold into which the adjusted Doppler velocity Vcar falls. Next, in step 450, a point p is added to the point list of the found group i for the given adjusted Doppler velocity Vcar, and the point counter for this found group is incremented. After step 450, the process returns to decision step 420 to determine if any more points need to be analyzed. When all of the points for a given radar scan have been analyzed, the decision step 420 will proceed to step 460 to determine which of the plurality of speed groups has the most points in its point counter, and to mark the points in the point list for this group as static objects (as per step 340 in FIG. 3).

Figure 5:
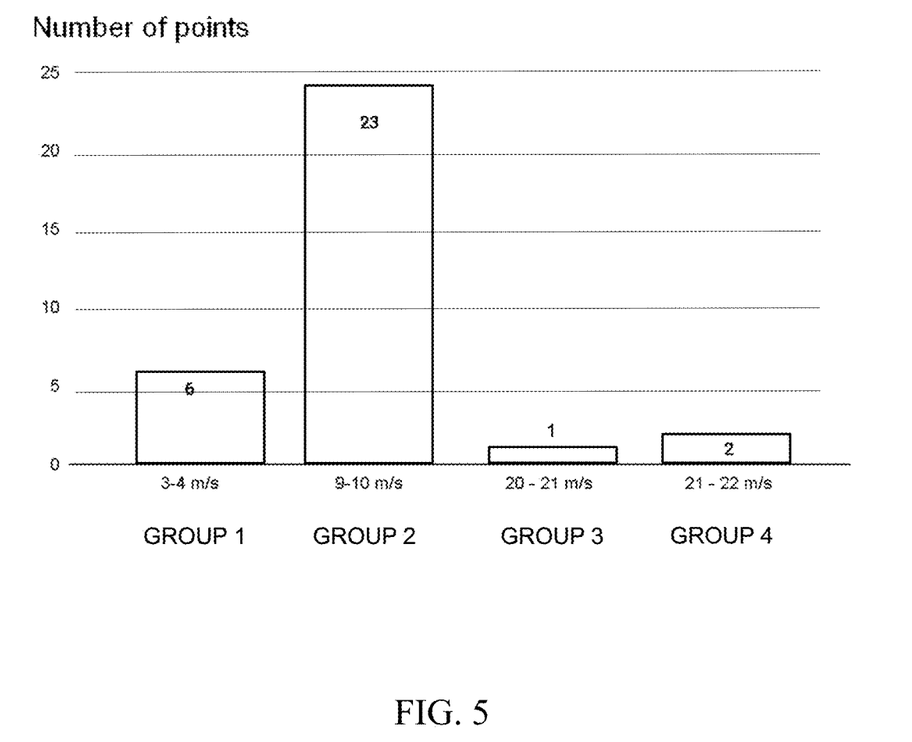
FIG. 5 is a bar graph showing results of grouping radar returns from a moving radar system to determine which radar returns are from static objects, in accordance with the aspects of the present disclosure.

FIG. 5 is a bar graph (histogram) showing results of grouping radar returns from a moving radar system 102 to determine which radar returns are from static objects 106 using the grouping algorithm 400 discussed above with regard to FIG. 4. For example, this histogram shown in FIG. 5 includes: Group 1 with 6 points (e.g., adjusted radar returns) that have an adjusted calculated car speed within 3 to 4 m/s; Group 2 with 23 points for a 9-10 m/s speed range; Group 3 with 1 point in the 20-21 m/s range; and Group 4 with 2 points in the 21-22 m/s range. Group 2 has the maximum number of points with 23 points, which is many more points than any of the other groups. Since it is known that there are many more static objects 106 in the environment of a car (or robot, or any other vehicle that moves on or close to the ground), this means all points in Group 2 that have calculated speed v>9 and v<10 are static objects 106. As such, use of the grouping algorithm 400 of FIG. 4 provides a highly accurate and convenient approach to achieve segmentation between static and dynamic objects using returns from a moving radar system.

In the specific example of FIG. 5, Vthreshold between Vmin and Vmax for each of the four illustrated groups is 1 m/s. It is noted, of course, that the specific groups shown in FIG. 5 are solely for purposes of non-limiting example, and any Vthreshold and any desired number of groups could be used. Further, the groups can be set to cover a large continuous range of velocities, or there can be gaps between the velocities covered by the groups. In other words, as shown in FIG. 5, a gap exists between Group 1 and Group 2 such that objects which have an adjusted car speed between 4 m/s and 9 m/s are not shown. However, in many instances, it is preferred to cover a continuous range of adjusted velocities by having the Vmax for a lower velocity group be the same as the Vmin for the next faster velocity group (e.g., as shown by the relationship between Group 3 and Group 4 in FIG. 5, where Vmax for Group 3 is 21 m/s and Vmin for Group 4 is 21 m/s). For example, as an alternative to the case shown in FIG. 5, there could be twenty-two speed groups, each with a Vthreshold of 1 m/s between 0 m/s and 22 m/s.

As described above with reference to steps 350 and 360 of FIG. 3, once it is determined which objects are static using the grouping algorithm 400, one can easily determine car speed of the car that the moving radar system 102 is mounted, and the speed of other nearby moving objects (e.g., other cars, trucks, etc., in the vicinity) by simply calculating an average for all car speeds from the static points speed group (e.g., Group 2 in the specific example of FIG. 5). Calculated car speed for the car which the radar system 102 is mounted on can be used to validate if static points are properly found in future scans in case those future scans may, for example, have more dynamic points or any error happens. Car speed for the car the radar is mounted on cannot change significantly between two radar scans, so it is possible to validate results by comparing the calculated car speed between successive scans, as shown in step 370 of FIG. 3.

One can also re-use previous calculated car speed of the car the radar system 102 is mounted on to find static points in the next scan(s), as shown in step 380 in FIG. 3. It is also possible to add logic to cover any other cases that are important for a given radar system. An addition benefit of the system and method described in the present disclosure is that it is possible to validate/correct car speed and segmentation processing by using alpha, beta or Kalman filters. In addition, determined car speed using the system and method of the present disclosure can be compared with GPS, odometer or other sensors reporting speed for extra validation, or can used in conjunction with any other processing in other systems mounted on the vehicle to validate determined results from other systems or to assist in calculations be preformed in such other systems.

Figure 6:
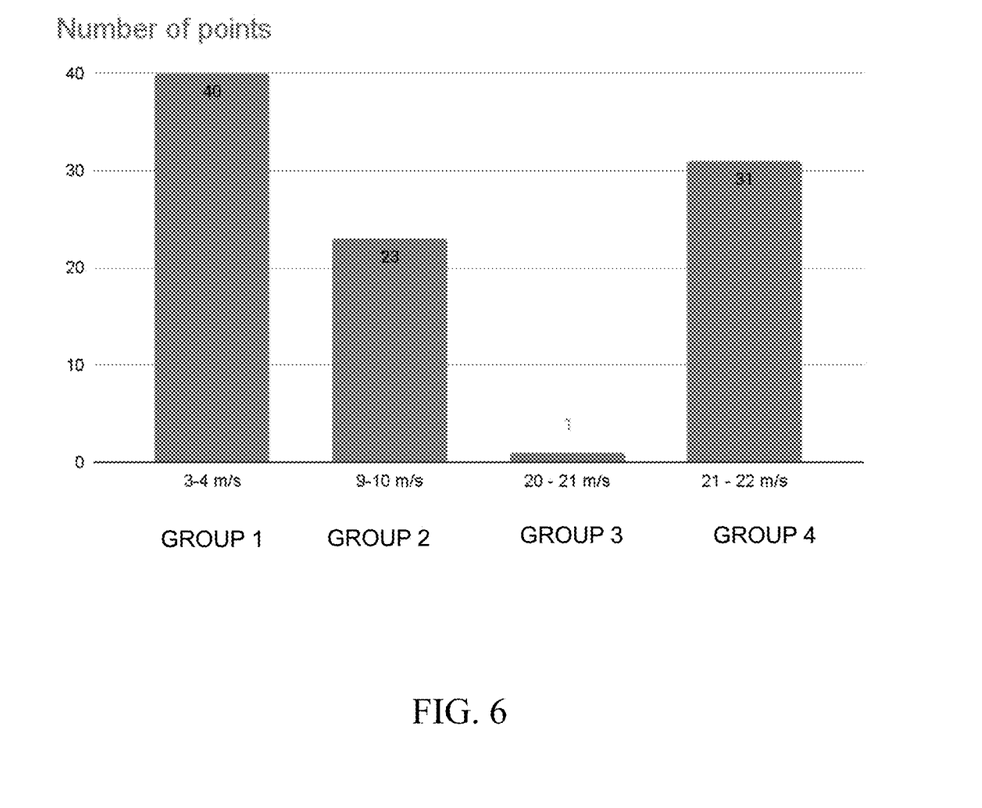
FIG. 6 is a bar graph showing results of grouping radar returns from a moving radar system to determine which radar returns are from static objects, in accordance with the aspects of the present disclosure, in "corner cases" when the number of dynamic points in the environment can temporarily become higher than the number of static points for one or more scans.
Figure 7:
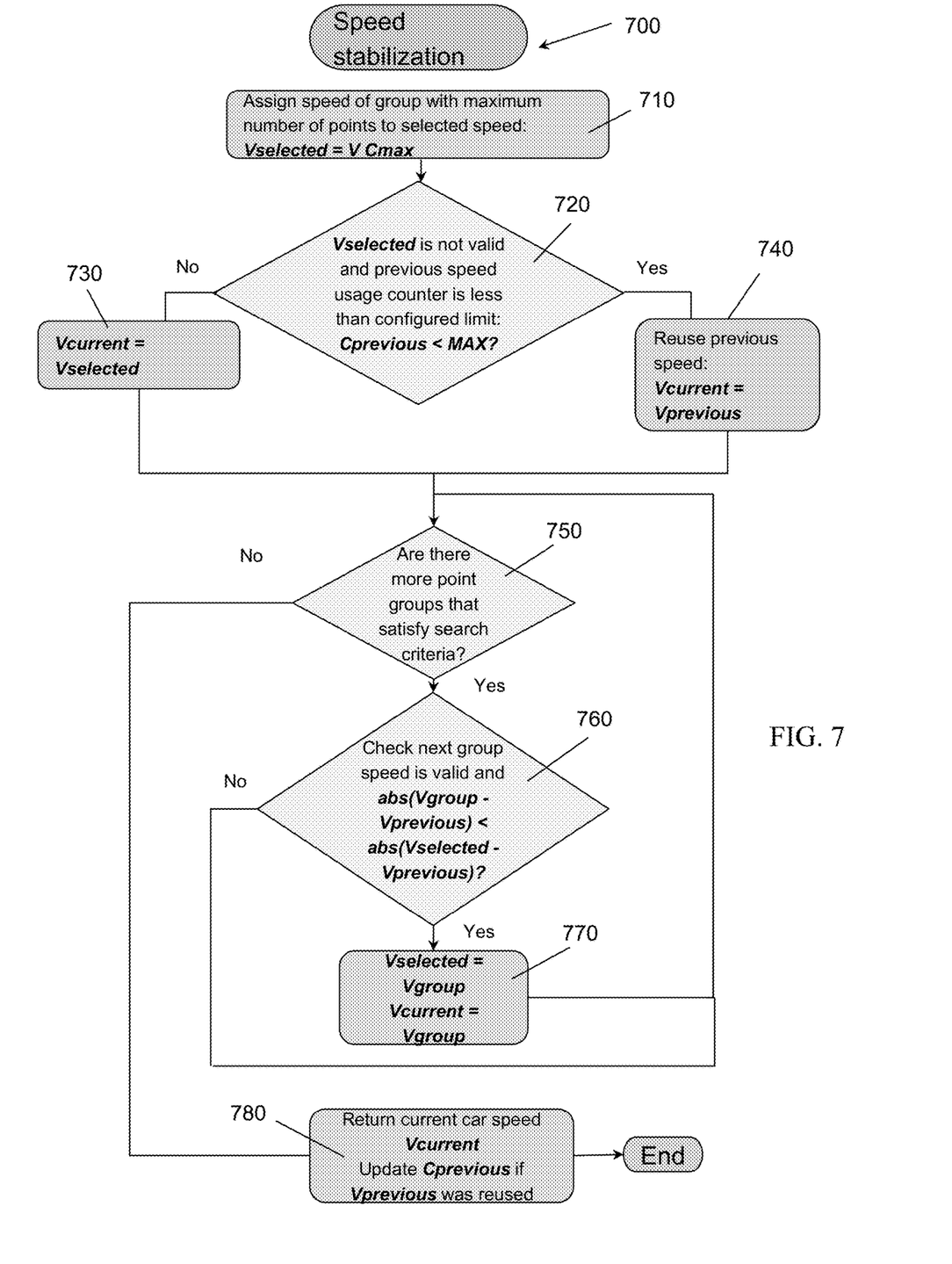
FIG. 7 is a flow diagram showing operations for avoiding inaccurate segmentation when the temporary situation shown in FIG. 6 occurs, in accordance with the aspects of the present disclosure.

FIG. 6 is a bar graph showing results of grouping radar returns from a moving radar system to determine which radar returns are from static objects, in accordance with the aspects of the present disclosure, in "corner cases" when the number of dynamic points in the environment can temporarily become higher than the number of static points for one or more scans. This can occur, for example, when a vehicle equipped with the radar system 102 is stopped in a low clutter environment and a large truck/bus is moving in front of the radar system 102, effectively blocking out most of the surrounding static objects from the radar system's view. These cases may produce incorrect segmentation results since dynamic points may be misidentified as static. In order to address these corner cases, a car speed stabilization algorithm 700 is shown in FIG. 7 which in fact extends the method that was previously discussed above to account for such corner cases. This algorithm 700 is based on a solution that compares car speed change between two or more subsequent subframes and evaluates if this change is valid.

More specifically, using the speed stabilization algorithm 700 shown in FIG. 7, if car speed determined from the speed group with maximum number of points is not valid, then the algorithm 700 simply continues with next groups until it is determined that the results obtained are realistic or indicate a valid speed change. Depending on the current radar system configuration and its expected behavior, this process can be made even more precise by parameterizing it with additional validation such as expected speed change (accelerating/slowing down), number of additional speed groups to check, minimum number of points, speed distance between groups etc.

For example, the histogram shown in FIG. 6 has a Group 1 (3-4 m/s) with 40 points that represents traffic in the same direction, a Group 2 (9-10 m/s) with 23 points that are static and a Group 4 (21-22 m/s) with 31 points that represents opposite direction traffic. Group 3 (20-21 m/s) has only 1 point, and, similar to the case in FIG. 5, can be disregarded. Car speed was measured on the previous subframe (e.g., before the temporary corner case occurred) at 10 m/s, and this can be regarded as an accurate reference of approximately what the actual platform velocity should be. The car stabilization algorithm shown in FIG. 7 checks all 3 groups (Groups 1, 2 and 4) indicating a large number of points, and selects Group 2 with 23 points as the accurate determination despite Groups 1 and 4 each having more points because speed threshold indicated in Group 2 (i.e., 9-10 m/s in this example) most closely matches previous car speed of 10 m/s measured before the temporary corner case occurred.

Referring now to the speed stabilization algorithm 700 of FIG. 7, in step 710, to begin the speed stabilization operation in a corner case situation, a speed Vselected=V Cmax is assigned to the group shown in FIG. 6 (corresponding to a corner case where the number of dynamic points temporarily exceeds the number of static points in the radar's field of view) with a maximum number of points (e.g., Group 1 in FIG. 6). Once this speed Vselected has been assigned in step 710, it is determined in step 720 as to whether "Vselected is not valid and if the previous speed usage counter is less than a configured limit: Cprevious<MAX?" In other words, this determines if the platform velocity that is currently being determined is significantly different than a platform velocity that has most immediately been previously determined and also checks the previous speed usage counter value as to whether it has not reached a preset Maximum level. This effectively determines "Valid or not?" in terms of "valid" meaning determining whether the speed changes between the frames are higher than a predetermined threshold or not, where the threshold can be a preset number or a number set by some other means.

If the answer to the question posed in step 720 is "Yes," then, instead of using the actual indicated current speed, step 740 will assign a previous speed Vprevious as Vcurrent, because, in this case, Vselected will be significantly different than Vprevious, for example, because of a sudden jump in the speed estimation, and this has not happened for several scans (up to Cmax). In this way, if the group with the highest number of points selected in step 710 is actually as corner case situation, where reliance on the data would lead to an inaccurate outcome, then the speed Vcurrent which would normally be selected for the group with the highest number of points will be disregarded, and a speed Vprevious from a scan prior to the occurrence of the corner case will be used instead.

In step 750, it is determined whether there are any other point groups (for example the groups 2 and 4 shown in FIG. 6) which satisfy the search criteria for a valid speed. If the answer to this question of step 750 is "No," then the algorithm proceeds to step 780 to return the current car speed Vcurrent and update Cprevious if Vprevious was reused. This will then end the speed stabilization operation 700 for that frame.

On the other hand, if the answer in step 750 is "Yes," then the algorithm proceeds to step 760 to check the next largest group speed (e.g., Group 4 with 31 points in the example of FIG. 6) to see if this group speed is valid (similar to the operation of step 720). In this case, "valid" means the speed changes between the scans are less than a defined threshold. Step 760 also examines the search criteria of abs(Vgroup−Vprevious)<abs(Vselected−Vprevious)? If the answer to this determination is "No," then the algorithm returns to step 750. If the answer to step 760 is "Yes," then the algorithm sets Vselected=Vgroup and Vcurrent=Vgroup in step 770 and ends the speed stabilization for that frame. However, if all the groups are checked, step 750 will indicate that no eligible groups remain in the current scan. In this case, operations go to step 780 and use the previously estimated speed and increase the Cprevious counter, and the operation of the speed stabilization algorithm is performed for the current scan.

If the answer to the question posed in step 720 is "No,' then a currently indicated speed Vcurrent of the current group of FIG. 6 with the most points is set to equal Vselected in step 730, and operations proceed to step 750. This means that the whole process has been repeated several times (up to Cmax), and no valid speed has been detected since the initial Vprevious value has been estimated incorrectly, causing a lack of convergence as this has happened for a total of Cmax frames. This means that the Vcurrent need to be updated to Vselected.

Figure 8:
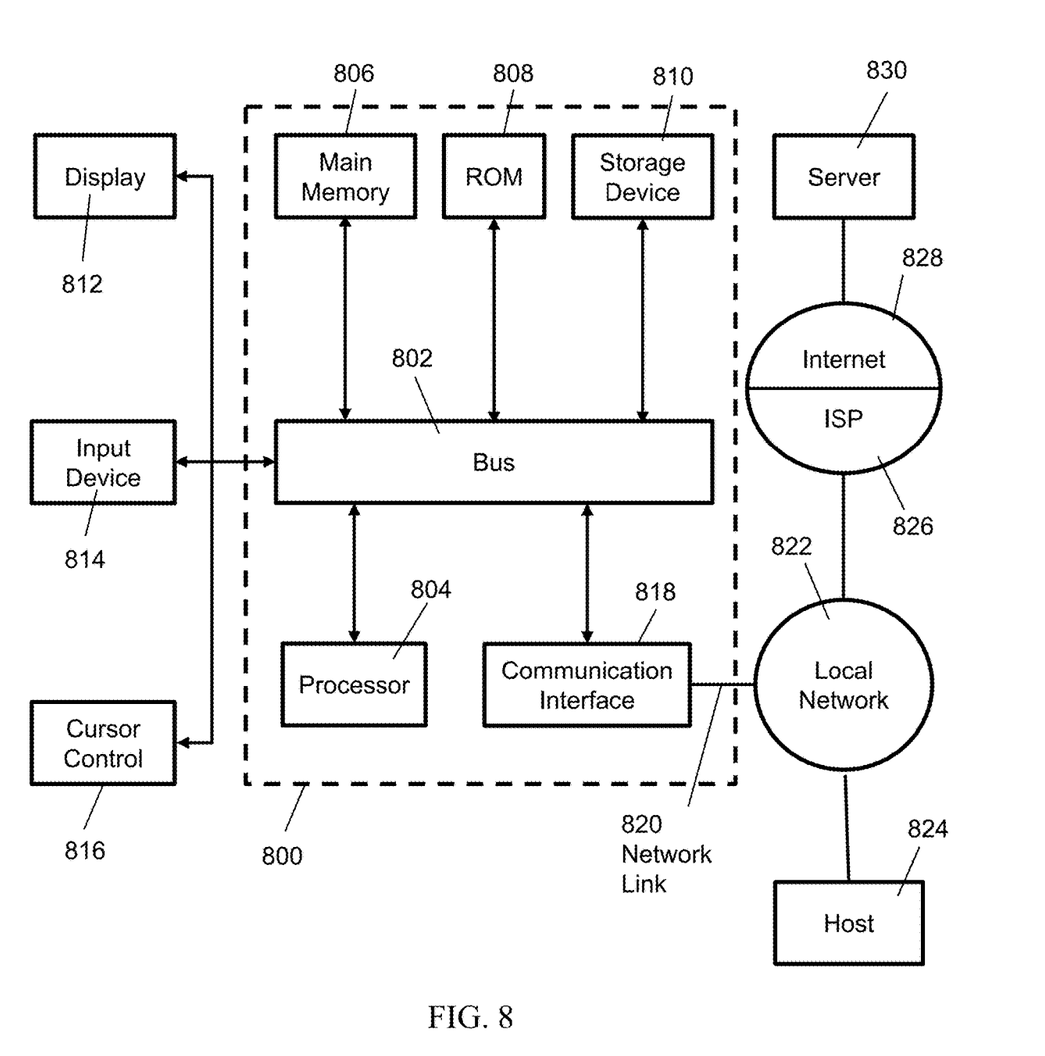
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, an on-board computer in the radar system 102 for running an application to carry out the processing shown in FIGS. 3-7, or, alternatively, a computer in a server in a cloud-based system to receive the radar returns from the radar system 102 to carry out the above-discussed signal processing.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, and a cursor control 816 for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A system including one or more processors and one or more machine-readable media storing instructions which, when executed by the one or more processors, cause the one or more processors to receive radar returns from objects in response to radar scans of transmitted radar signals from the radar system, adjust a velocity indicated in each of the radar returns based on an azimuth of each of the received radar returns to generate a set of adjusted radar returns, group the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, and determine which of the objects are static objects based on determining which group of the plurality of groups has highest number of adjusted radar returns.

Item 2. The system of item 1, wherein the instructions, when executed by the one or more processors, cause the one or more processors to determine platform velocity of the moving platform from the determination of which objects are static objects.

Item 3. The system of items 1 or 2, wherein determination of platform velocity is based on setting velocity for the group of static objects to be zero velocity and determining the platform velocity relative to the zero velocity of the static objects.

Item 4. The system of any of items 1-3, wherein the instructions, when executed by the one or more processors, cause the one or more processors to determine velocity of the objects identified by the received radar returns, other than the static objects, relative to the zero velocity of the group of static object returns.

Item 5. The system of any of items 1-4, wherein the moving platform is at least one selected from a group consisting of: a vehicle; a robot; and a drone.

Item 6. The system of any of items 1-5, wherein the moving platform is a robot.

Item 7. The system of any of items 1-6, wherein the groups of returns are adjacent to one another, with Vmax of each group being equal to Vmin of an adjacent upper group of greater velocity returns, and with Vmin of each group being equal to Vmax of an adjacent group of lower velocity returns.

Item 8. The system of any of items 1-7, wherein all of the groups of returns have a same threshold velocity difference between Vmin and Vmax.

Item 9. The system of any of items 1-8, wherein adjusting the velocity indicated in each of the radar returns based on the azimuth of each of the received radar returns to generate the set of adjusted radar returns is performed using a formula: Adjusted Doppler Radial Velocity=Radial Velocity Indicated by Return×cos ($\phi$), where $\phi$ is an azimuth angle for each of the radar returns.

Item 10. The system of any of items 1-9, wherein the instructions, when executed by the one or more processors, cause the one or more processors to validate the determination of the platform velocity by comparing a determination of the platform velocity between two successive scans of transmitting radar signals from the radar system.

Item 11. The system of any of items 1-10, wherein the instructions, when executed by the one or more processors, cause the one or more processors to reuse, during processing of radar returns from a radar scan, a determined platform velocity from a previous scan.

Item 12. The system of any of items 1-11, wherein the instructions, when executed by the one or more processors, cause the one or more processors to adjust the determined platform velocity based on a determination of at least one of yaw or pitch angle of the moving platform.

Item 13. A method including receiving radar returns from objects in response to radar scans of transmitted radar signals from a radar system, adjusting a velocity indicated in each of the radar returns based on an azimuth of each of the received radar returns to generate a set of adjusted radar returns, grouping the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, and determining which of the objects are static objects based on determining which group of the plurality of groups has highest number of adjusted radar returns.

Item 14. The method of item 13, further including determining platform velocity from the determination of which objects are static objects.

Item 15. The method of item 13 or 14, wherein determination of platform velocity is based on setting velocity for the group of static objects to be zero velocity and determining the platform velocity relative to the zero velocity of the static objects.

Item 16. The method of any one of items 13-15, further including determining velocity of the objects identified by the received radar returns, other than the static objects, relative to the zero velocity of the group of static object returns.

Item 17. The method of any one of items 13-16, wherein the groups of returns are adjacent to one another, with Vmax of each group being equal to Vmin of an adjacent upper group of greater velocity returns, and with Vmin of each group being equal to Vmax of an adjacent group of lower velocity returns.

Item 18. The method of any one of items 13-17, wherein all of the groups of returns have a same threshold velocity difference between Vmin and Vmax.

Item 19. The method of any one of items 13-18, further including adjusting the velocity indicated in each of the radar returns based on the azimuth of each of the received radar returns to generate the set of adjusted radar returns is performed using a formula: Adjusted Doppler Radial Velocity=Radial Velocity Indicated by Return×cos ($\phi$), where $\phi$ is an azimuth angle for each of the radar returns.

Item 20. A system to segment static objects from dynamic moving objects using a radar system including a transmitter and a receiver mounted on a moving platform, the system including one or more processors coupled to receive signals from the radar system, and one or more machine-readable media storing instructions which, when executed by the one or more processors, cause the one or more processors to: receive radar returns from objects in response to radar scans of transmitted radar signals from the radar system, adjust a velocity indicated in each of the radar returns based on an azimuth of each of the received radar returns to generate a set of adjusted radar returns, group the adjusted radar returns into a plurality of groups based on the velocity indicated in each of the adjusted radar returns, each of the groups having predetermined minimum velocity value Vmin, a predetermined maximum velocity value Vmax, and a predetermined threshold velocity difference value between Vmin and Vmax, determine which of the objects are static objects based on determining which group of the plurality of groups has highest number of adjusted radar returns, determine platform velocity of the moving platform from the determination of which objects are static objects by setting velocity for the group of static objects to be zero velocity and determining the platform velocity relative to the zero velocity of the static objects, and determine velocity of the dynamic moving objects identified by the received radar returns, relative to the zero velocity of the group of static object returns.

Item 21: The system of item 20, further including instructions which, when executed by the one or more processors, cause the one or more processors to perform the further steps of checking a current platform velocity determined from a current determination of which objects are static objects against an immediately previous determination of platform velocity, and using the previous determination of platform velocity if a difference between the currently determined platform velocity and the immediately previously determined platform velocity exceeds a predetermined threshold.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:
   one or more processors coupled to receive signals from a radar system including a transmitter and a receiver mounted on a moving platform; and
   one or more machine-readable media storing instructions which, when executed by the one or more processors, cause the one or more processors to:
   receive radar returns from objects in response to radar scans of transmitted radar signals from the radar system, wherein the radar returns include Doppler shift;
   adjust a velocity indicated in each of the radar returns based on an azimuth of each of the received radar returns to generate a set of adjusted Doppler radar returns;
   after generating the set of adjusted Doppler radar returns, group the set of adjusted Doppler radar returns into a histogram having a plurality of groups based on the velocity indicated in each of the adjusted Doppler radar returns, each of the groups of the histogram having a predetermined minimum velocity value Vmin, a predetermined maximum velocity value Vmax, and a predetermined threshold velocity difference value between Vmin and Vmax; and
   determine which of the objects are static objects based on determining which group of the plurality of groups in the histogram has a highest number of adjusted Doppler radar returns.

2. The system of claim 1, wherein the instructions, when executed by the one or more processors, cause the one or more processors to determine platform velocity of the moving platform from the determination of which objects are static objects.

3. The system of claim 2, wherein determination of platform velocity is based on setting velocity for the group of static objects to be zero velocity and determining the platform velocity relative to the zero velocity of the static objects.

4. The system of claim 3, wherein the instructions, when executed by the one or more processors, cause the one or more processors to determine velocity of the objects identified by the received radar returns, other than the static objects, relative to the zero velocity of the group of static object returns.

5. The system of claim 4, wherein the moving platform is at least one selected from a group consisting of: a vehicle; a robot; and a drone.

6. The system of claim 4, wherein the moving platform is a robot.

7. The system of claim 4, wherein the groups of adjusted Doppler radar returns are adjacent to one another, with Vmax of each group being equal to Vmin of an adjacent upper group of greater velocity returns, and with Vmin of each group being equal to Vmax of an adjacent group of lower velocity returns.

8. The system of claim 7, wherein all of the groups of adjusted Doppler radar returns have a same threshold velocity difference between Vmin and Vmax.

9. The system of claim 4, wherein adjusting the velocity indicated in each of the radar returns based on the azimuth of each of the received radar returns to generate the set of adjusted Doppler radar returns is performed using a formula:

Adjusted Doppler Radial Velocity=Radial Velocity Indicated by Return×cos(ϕ)

where ϕ is an azimuth angle for each of the radar returns.

10. The system of claim 9, wherein the instructions, when executed by the one or more processors, cause the one or more processors to validate the determination of the platform velocity by comparing a determination of the platform velocity between two successive scans of transmitting radar signals from the radar system.

11. The system of claim 9, wherein the instructions, when executed by the one or more processors, cause the one or more processors to reuse, during processing of radar returns from a radar scan, a determined platform velocity from a previous scan.

12. The system of claim 9, wherein the instructions, when executed by the one or more processors, cause the one or more processors to adjust the determined platform velocity based on a determination of at least one of yaw or pitch angle of the moving platform.

13. A method comprising:
receiving radar returns from objects in response to radar scans of transmitted radar signals from a radar system, wherein the radar returns include Doppler shift;
adjusting a velocity indicated in each of the radar returns based on an azimuth of each of the received radar returns to generate a set of adjusted Doppler radar returns;
after generating the set of adjusted Doppler radar returns, grouping the set of adjusted Doppler radar returns into a histogram having a plurality of groups based on the velocity indicated in each of the adjusted Doppler radar returns, each of the groups of the histogram having a predetermined minimum velocity value Vmin, a predetermined maximum velocity value Vmax, and a predetermined threshold velocity difference value between Vmin and Vmax; and
determining which of the objects are static objects based on determining which group of the plurality of groups in the histogram has a highest number of adjusted Doppler radar returns.

14. The method of claim 13, further comprising determining platform velocity from the determination of which objects are static objects.

15. The method of claim 14, wherein determination of platform velocity is based on setting velocity for the group of static objects to be zero velocity and determining the platform velocity relative to the zero velocity of the static objects.

16. The method of claim 15, further comprising determining velocity of the objects identified by the received radar returns, other than the static objects, relative to the zero velocity of the group of static object returns.

17. The method of claim 16, wherein the groups of returns are adjacent to one another, with Vmax of each group being equal to Vmin of an adjacent upper group of greater velocity returns, and with Vmin of each group being equal to Vmax of an adjacent group of lower velocity returns.

18. The method of claim 17, wherein all of the groups of returns have a same threshold velocity difference between Vmin and Vmax.

19. The method of claim 17, further comprising adjusting the velocity indicated in each of the radar returns based on the azimuth of each of the received radar returns to generate the set of adjusted Doppler radar returns is performed using a formula:

Adjusted Doppler Radial Velocity=Radial Velocity Indicated by Return×cos(ϕ)

where ϕ is an azimuth angle for each of the radar returns.

20. A system to segment static objects from dynamic moving objects using a radar system including a transmitter and a receiver mounted on a moving platform, the system comprising:
one or more processors coupled to receive signals from the radar system; and
one or more machine-readable media storing instructions which, when executed by the one or more processors, cause the one or more processors to:
receive radar returns from objects in response to radar scans of transmitted radar signals from the radar system, wherein the radar returns include Doppler shift;
adjust a velocity indicated in each of the radar returns based on an azimuth of each of the received radar returns to generate a set of adjusted Doppler radar returns;
after generating the set of adjusted radar returns, group the adjusted Doppler radar returns into a histogram having a plurality of groups based on the velocity indicated in each of the adjusted Doppler radar returns, each of the groups having a predetermined minimum velocity value Vmin, a predetermined maximum velocity value Vmax, and a predetermined threshold velocity difference value between Vmin and Vmax;
determine which of the objects are static objects based on determining which group of the plurality of groups in the histogram has a highest number of adjusted Doppler radar returns;
determine platform velocity of the moving platform from the determination of which objects are static objects by setting velocity for the group of static objects to be zero velocity and determining the platform velocity relative to the zero velocity of the static objects; and
determine velocity of the dynamic moving objects identified by the received radar returns, relative to the zero velocity of the group of static object returns.

21. The system of claim 20, further comprising instructions which, when executed by the one or more processors, cause the one or more processors to perform further steps of checking a current platform velocity determined from a current determination of which objects are static objects against an immediately previous determination of platform velocity, and using the previous determination of platform velocity if a difference between the currently determined platform velocity and the immediately previously determined platform velocity exceeds a predetermined threshold.

\* \* \* \* \*